United States Patent [19]

Kawase et al.

[11] Patent Number: 5,495,248
[45] Date of Patent: Feb. 27, 1996

[54] STABILIZING METHOD OF SYNTHETIC APERTURE RADAR AND POSITION DETERMINING METHOD THEREOF

[75] Inventors: Masatoshi Kawase, Yachiyo; Seiichi Maeda, Houya; Takahiko Fujisaka, Kamakura; Yoshimasa Oh-Hashi, Kamakura; Michimasa Kondo, Kamakura; Natsuki Kondo, Kamakura, all of Japan

[73] Assignees: Sachio Uehara, Director General, Technical Research and Development Institute, Japan Defence Agency; Mitsubishi Denki Kabushiki Kaisha, both of Tokyo, Japan

[21] Appl. No.: 153,675

[22] Filed: Nov. 16, 1993

[30] Foreign Application Priority Data

Nov. 25, 1992 [JP] Japan ................................. 4-314934

[51] Int. Cl.⁶ .......................... G01S 13/74; G01S 13/90
[52] U.S. Cl. ............................. 342/25; 342/43; 342/191
[58] Field of Search ........................... 342/25, 171, 184, 342/161, 126, 133, 191, 43, 44, 47, 46

[56] References Cited

U.S. PATENT DOCUMENTS

| 3,716,856 | 2/1973 | Beguin | 342/171 |
| 4,831,604 | 5/1989 | McKnight | 367/99 |
| 4,989,008 | 1/1991 | Fujisaka et al. | 342/25 |
| 5,053,772 | 10/1991 | Lamper et al. | 342/25 |
| 5,059,966 | 10/1991 | Fujisaka et al. | 342/25 |

OTHER PUBLICATIONS

Kirk, IEEE Transactions on Aerospace & Electronic Systems, "Motion Compensation for Synthetic Aperture Radar".

Primary Examiner—Daniel T. Pihulic
Attorney, Agent, or Firm—Wolf, Greenfield & Sacks

[57] ABSTRACT

A stabilizing method of a synthetic aperture radar and a position determining method by the radar. At least three repeaters are arranged in mutually different positions on the ground or the sea and a radio frequency signal having a predetermined frequency is transmitted from the radar mounted on a radar platform such as an aircraft to the repeaters. Each repeater frequency-modulates and amplifies the received signal to return the signal to the radar. The radar receives the signal returned from each repeater. The radar calculates a distance between the radar platform and each repeater on the basis of a time required for the transmitting and the receiving and phase information of the received signal. When the position of each repeater is known, by using the positions of the repeaters and the calculated distances, the position of the radar platform can be calculated. On the basis of the obtained position of the radar platform, a reference signal for phase compensation is generated. The radar eliminates a phase variation of a reflected wave received from an object to be acquired by multiplying the reflected wave by the reference signal for phase compensation.

22 Claims, 6 Drawing Sheets

STABILIZING METHOD OF SYNTHETIC APERTURE RADAR AND POSITION DETERMINING METHOD THEREOF

BACKGROUND OF THE INVENTION i) Field of the Invention

The present invention relates to a method for reducing degradation of imaging performance by maneuver of a radar platform in a synthetic aperture radar and a method of measuring or determining a position of the moving platform by using the radar.

ii) Description of the Related Arts

Figure 6:
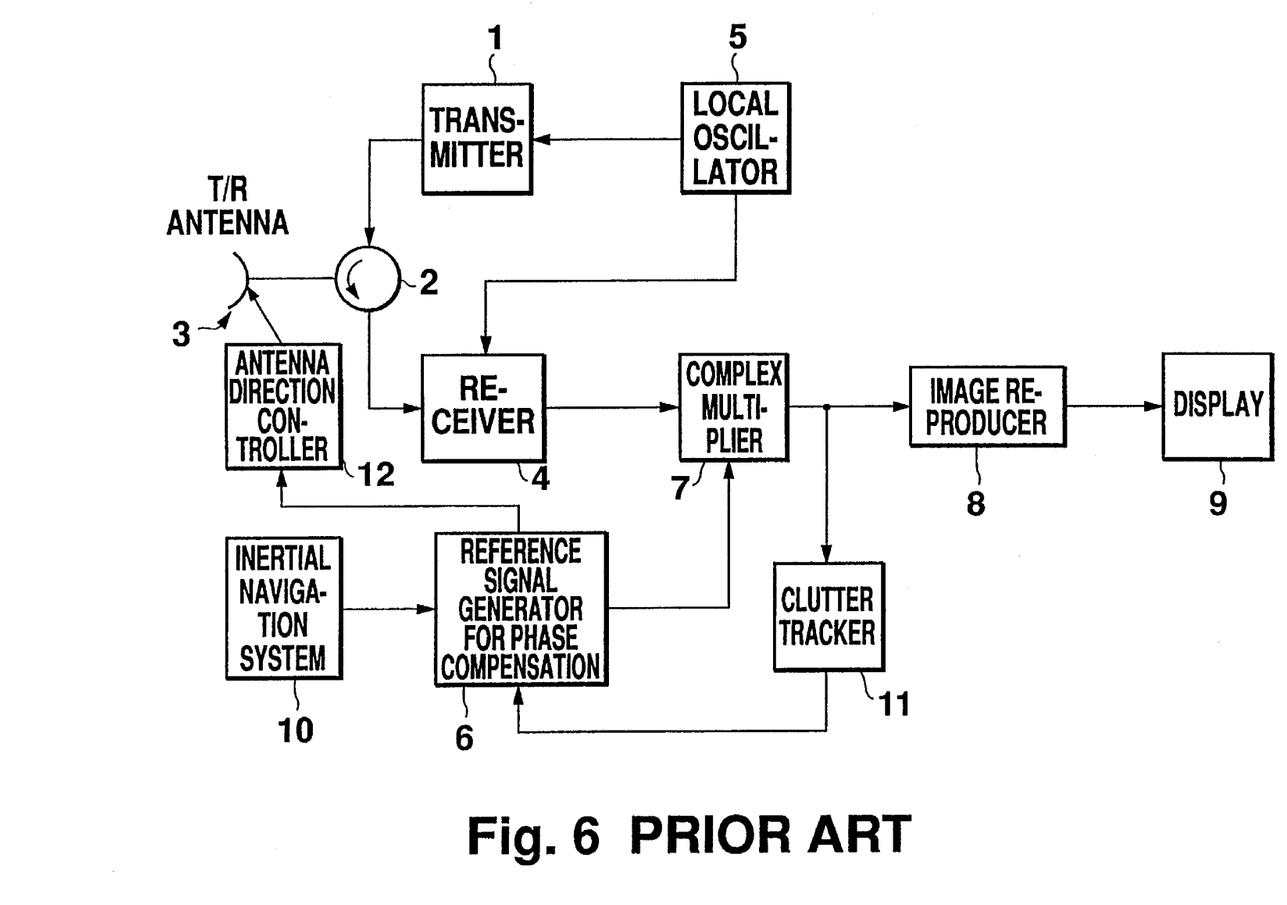
FIG. 6 is a block diagram of a conventional synthetic aperture radar.

In FIG. 6, there is shown a conventional synthetic aperture radar, as disclosed in "Motion Compensation For Synthetic Aperture Radar" by J. C. Kirk, Jr., IEEE. Transaction on Aerospace and Electronic Systems, Vol. AES-11, No. 3, pp. 338–348. In FIG. 6, the synthetic aperture radar is comprised of a transmitter 1, a T/R (transmitter/receiver) changeover circulator 2, a T/R antenna 3, a receiver 4, a local oscillator 5 for supplying a local oscillation signal to the transmitter 1 and the receiver 4, a reference signal generator 6 for phase compensation, a complex multiplier 7 for carrying out a complex multiplication of two output signals supplied from the reference signal generator and the receiver 4, an image reproducer 8 connected to the complex multiplier 7, a display 9 connected to the image reproducer 8, an inertial navigation system 10 for supplying data such as a position, a velocity and the like of a radar platform to the reference signal generator 6, a clutter tracker 11 for detecting a central spectrum of an output signal of the complex multiplier 7 to supply the detected central spectrum to the reference signal generator 6, and an antenna direction controller 12 for directing a beam of the antenna 3 to an object to be acquired according to a reference signal for phase compensation, supplied from the reference signal generator 6.

Figure 7:
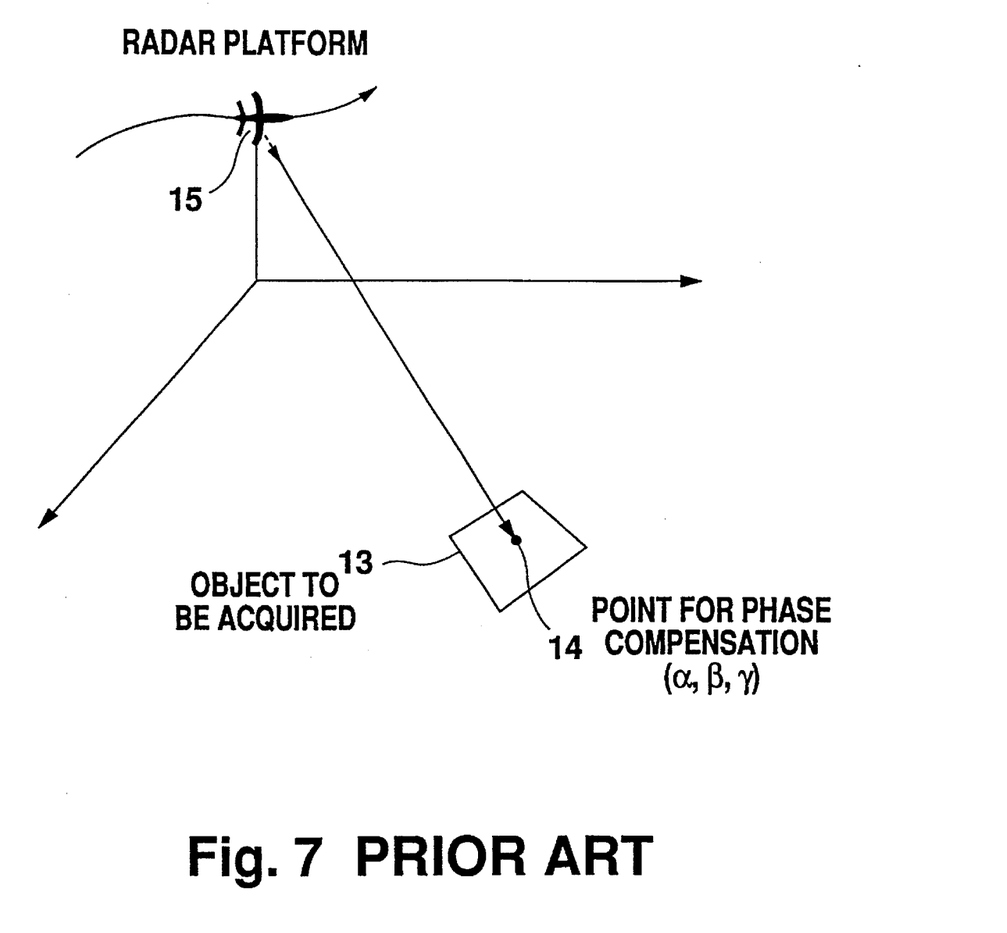
FIG. 7 is a schematic view showing a conventional stabilizing method of the synthetic aperture radar shown in FIG. 6.

FIG. 7 illustrates a conventional motion compensation method of the synthetic aperture radar shown in FIG. 6. In FIG. 7, numerals 13, 14 and 15 denote the object to be acquired, a reference point for motion compensation, and the radar platform carrying the synthetic aperture radar, respectively.

Next, the operation of the synthetic aperture radar described above will now be described in connection with FIGS. 6 and 7.

A radio frequency signal generated by the transmitter 1 is irradiated toward the object 13 to be acquired from the T/R antenna 3 via the T/R changeover circulator 2. The radio frequency signal reflected by the object 13 is received by the T/R antenna 3 and the received radio frequency signal is sent to the receiver 4 via the T/R changeover circulator 2 and is amplified and detected therein. The detected signal is supplied to the complex multiplier 7 and the complex multiplier 7 carries out a complex multiplication of the detected signal and the reference signal for motion compensation generated by the reference signal generator 6. Hence, the same radar echo is obtained as the radar platform 15 is stabilized against the maneuver. At this time, a phase shift amount to be given to the reference signal for motion compensation can be calculated from a relative distance between the reference point 14 for phase compensation as any point within the object 13 and the radar platform 15, as shown in FIG. 7. The position of the radar platform 15 is obtained from the inertial navigation system 10.

The position determining precision of the radar platform 15, required in the calculation of the phase shift amount is considered to be approximately a transmitting wavelength, and in case of the synthetic aperture radar mounted on an aircraft and a space vehicle, its wavelength becomes approximately 3 cm to 10 cm. In general, the position determining precision by using the inertial navigation system 10 is approximately several meters to several tens of meters. Thus, the position determining precision by the inertial navigator 10 is bad and it is necessary to compensate for a difference from the above-described necessary precision (approximately 3 cm to 10 cm). Hence, first, the output signal of the complex multiplier 7 is taken into the clutter tracker 11 for detecting the central frequency of its spectrum. Then, the phase compensation amount is calculated so that the difference between the obtained central frequency and a central frequency of a received signal spectrum to be obtained when there is no maneuver of the radar platform 15. In the reference signal generator 6 for phase compensation, by adding the calculated phase compensation amount to the phase shift amount calculated from the relative distance as described above, the insufficient phase measuring precision of the inertial navigation system 10 is compensated. At this time, the measuring precision of the central frequency of the received signal spectrum depends on a signal to noise power ratio and a variation of a radar cross section of the object 13 to be acquired with the motion of the radar platform 15.

Further, as a position determining method in place of the inertial navigation system 10, a GPS (global positioning system) is well-known, in which high frequency signals are irradiated from transmitters mounted on at least four satellites launched into mutually different orbits and the irradiated high frequency signals are received by a receiver mounted on a radar platform to measure a position of the receiver. As examples of the GPS, a NAVSTAR/GPS and a GLONASS are known. However, in this system, different oscillators (clocks) are used in the transmitter and receiver sides and hence information relating to the phases of the signals used in the transmitter side can not be utilized in the receiver side. Hence, since the relative distances between the transmitters and the receiver are calculated from the signal transmission times between the same, the precision becomes approximately several meter at the most and the position determining precision is insufficient for use in the stabilization of the synthetic aperture radar. Further, in the GPS, it is insufficient to use three transmitters for determining the position of the radar platform in the three-dimensional space. That is, the clock mounted to each transmitter has a time offset and thus this time offset must be treated as an unknown quantity. Hence, in order to solve four-dimensional simultaneous equations, a fourth transmitter (a fourth satellite) is required.

In the conventional synthetic aperture radar, since the stabilization is carried out as described above, with the motion of the radar platform, the radar cross section of the object to be acquired is varied, or by a receiver noise, an error is caused in measuring the frequency of the received signal. These are regarded as the maneuver of the radar platform and hence the phase compensation amount including the error can be calculated.

Further, considering as the position determining method of the radar platform, the determining precision by the inertial navigation system is approximately several tens of meters and it becomes approximately several meters even in the GPS. Hence, a position determining method with a higher precision than the method utilizing the signal transmission time between the transmitter and the receiver has been required.

SUMMARY OF THE INVENTION

Accordingly, it is an object of the present invention to provide a motion compensation method of a synthetic aperture radar in view of the aforementioned problems of the prior art, which is capable of neglecting influences of a variation of a radar cross section of an object to be acquired and a receiver noise and compensating insufficient position determining precision of an inertial navigation system.

It is another object of the present invention to provide a position determining method of a moving platform with high precision by using a synthetic aperture radar in view of the aforementioned problems of the prior art, which is capable of neglecting influences of a variation of a radar cross section of an object to be acquired and a receiver noise and compensating insufficient position determining precision of an inertial navigation system.

According to the present invention, a position determining method of a radar platform by a radar mounted thereon, comprising the steps of:

a) a first step for transmitting a first signal or signals having a predetermined frequency or frequencies from the radar to at least three signal answer back means arranged in predetermined mutually different positions;

b) a second step for receiving the first signal or one of the first signals transmitted in the first step by each signal answer back means;

c) a third step for transmitting a second signal having a predetermined frequency from each signal answer back means toward the radar platform in response to the signal receiving in the second step;

d) a fourth step for receiving the second signals transmitted from respective signal answer back means by the radar;

e) a fifth step for detecting times from the transmitting of the first signal or signals to the receiving of the second signals' for every receiving of second signal, by the radar;

f) a sixth step for detecting phases of respective second signals received in the fourth step by the radar;

g) a seventh step for calculating distances between the radar platform and the signal answer back means on the basis of the times detected in the fifth step and the phases detected in the sixth step; and h) an eighth step for calculatlng a position of the radar platform on the basis of known positions of the signal answer back means and the distances calculated in the seventh step.

According to the present invention, a position determining system for determining a position of a radar platform, comprising:

a) a radar mounted on the radar platform; and b) at least three signal answer back means arranged in predetermined mutually different positions, wherein the radar includes:

a1) means for transmitting a first signal or signals having a predetermined frequency or frequencies to the at least three signal answer back means, each signal answer back means includes:

b1) means for receiving the first signal or one of the first signals transmitted from the radar; and b2) means for transmitting a second signal having a predetermined frequency to the radar platform in response to the receiving of the first signal or signals, and the radar further includes:

a2) means for receiving the second signals transmitted from the signal answer back means;

a3) first detecting means for detecting times from the transmitting of the first signal or signals to the receiving of the second signals, for every receiving of the second signal;

a4) second detecting means for detecting phases of respective second signals received;

a5) first calculating means for calculating distances between the radar platform and the signal answer back means on the basis of the times detected and the phases detected; and a6) second calculating means for calculating a position of the radar platform on the basis of known positions of the signal answer back means anti the distances calculated.

According to the present invention, a motion compensation method of a synthetic aperture radar mounted on a radar platform, comprising the steps of:

a) a first step for transmitting a first signal or signals having a predetermined frequency or frequencies from the radar to at least three signal answer back means arranged in predetermined mutually different positions;

b) a second step for receiving the first signal or one of the first signals transmitted in the first step by each signal answer back means;

c) a third step for transmitting a second signal having a predetermined frequency from each signal answer back means toward the radar platform in response to the signal receiving in the second step;

d) a fourth step for receiving the second signals transmitted from respective signal answer back means by the radar;

e) a fifth step for detecting times from the transmitting of the first signal or signals to the receiving of the second signals, for every receiving of the second signal, by the radar;

f) a sixth step for detecting phases of respective second signals received in the fourth step by the radar;

g) a seventh step for calculating distances between the radar platform and the signal answer back means on the basis of the times detected in the fifth step and the phases detected in the sixth step;

h) an eighth step for calculating a position of the radar platform on the basis of known positions of the signal answer back means and the distances calculated in the seventh step;

i) a ninth step for generating a reference signal for phase compensation on the basis of the position of the radar platform, calculating in the eighth step;

j) a tenth step for transmitting a signal from the radar to an object to be acquired and receiving a reflected signal from the object; and k) an eleventh step for multiplying the reference signal for phase compensation by the reflected signal received in the tenth step, the position calculated in the eight step varying depending on maneuver of the radar platform, the reference signal for phase compensation generated in the ninth step varying depending on the inclination of the radar platform, a phase shift of the reflected signal received in the tenth step being compensated by the multiplying in the eleventh step.

In the present invention, by using at least three signal answer back means such as repeaters, the position of the radar platform such as a moving body, i.e. an aircraft or the like is determined and the motion compensation is carried out on the basis of the determination result.

That is, first, the first signal is, first signals are, transmitted from the radar (for example, a synthetic aperture radar) to each signal answer back means. The first signal or signals transmitted from the radar may have the same frequency or different frequencies with respect to all the signal answer back means. After receiving the first signal, each signal answer back means transmits the second signal having the predetermined frequency toward the radar platform.

The radar receives the second signals and detects signal transmission times (exactly times from the receiving of the first signal to the receiving of the second signals) and the phases of the second signals. The radar further calculates the distances between the radar platform and the respective signal answer back means on the basis of the detected signal transmission times and the detected phases.

Now, the each distance between the radar platform and each signal answer back means is mathematically expressed by using the positional coordinates of the radar platform and the signal answer back means. When such a numerical formula is given as to a certain signal answer back means, the positional coordinates of the radar platform as an unknown quantity are included in the numerical formula. Since the positional coordinates of the radar platform are usually three-dimensional coordinates, at least three such numerical formulas are made corelative to obtain simultaneous equations and by solving these simultaneous equations, the positional coordinates of the radar platform can be obtained. Hence, according to the present invention, at least three signal answer back means are used and these signal answer back means are arranged in the predetermined mutually different positions.

The radar, in turn, transmits a signal to an object to be acquired and receives a reflected signal from the object. The radar multiplies the reflected signal to a reference signal for phase compensation. Since this reference signal for phase compensation is generated on the basis of the positional coordinates of the radar platform obtained by the calculation, its phase shift reflects maneuver of the radar platform and thus the position variation of the radar platform. Hence, by multiplying the reference signal for phase compensation by the reflected signal received, the maneuver of the radar platform can be compensated. At this time, there is no need to detect a central spectrum from a result of a complex multiplication by a clutter tracker and to feed back this central spectrum to a reference signal generator.

Therefore, according to the present invention, the position determination of the radar platform is carried out without using any reflected signal from the object to be acquired, and thus the exact position determination and the stabilization can be performed even when radar cross section of the object to be acquired is varied. Further, in the position determining method using the aforementioned signal reflecting means, phase information is used in addition to the signal transmission times, and therefore the position determining precision is raised.

Further, when the repeaters as the signal answer back means are used, the signals are amplified by the repeaters and the signal to noise power ratio also sufficiently becomes high. As a result, it is hardly inclined to receive the influence of the receiver noise.

As described above, according to the present invention, the position determination can be executed with higher precision than the conventional method without receiving the influence of the variation of the radar cross section of the object to be acquired and the influence of the receiver noise. Hence, the motion compensation using this result becomes more exact. Further, when an image is displayed on the basis of the compensated signals, the imaging performance becomes good.

The repeaters used as the signal answer back means in the present invention have at least the function for receiving the first signal from the radar, the function for amplifying the receive first signal, and the function for transmitting the amplified first signal as the second signal toward the radar platform. Further, the repeaters execute not only the amplification but also the frequency-modulation. At this time, the modulation frequencies of the frequency modulating means can be determined to be mutually different values. Hence, from which repeater the answer back can be discriminated on the radar side.

Also, a plurality kinds of first signals can be transmitted from the radar to the repeaters and the modulation frequencies can be made mutually different in the repeaters. Thus, by the use of a combination of the first signals having the different frequencies and the modulation frequencies in the repeaters, the range resolution relating to the position determination can be raised. As a result, the suppression performance of the clutters can be improved and the influence of the echoes from other parts except the repeaters in the position determination can not be received. Hence, the motion compensation can become excellent.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
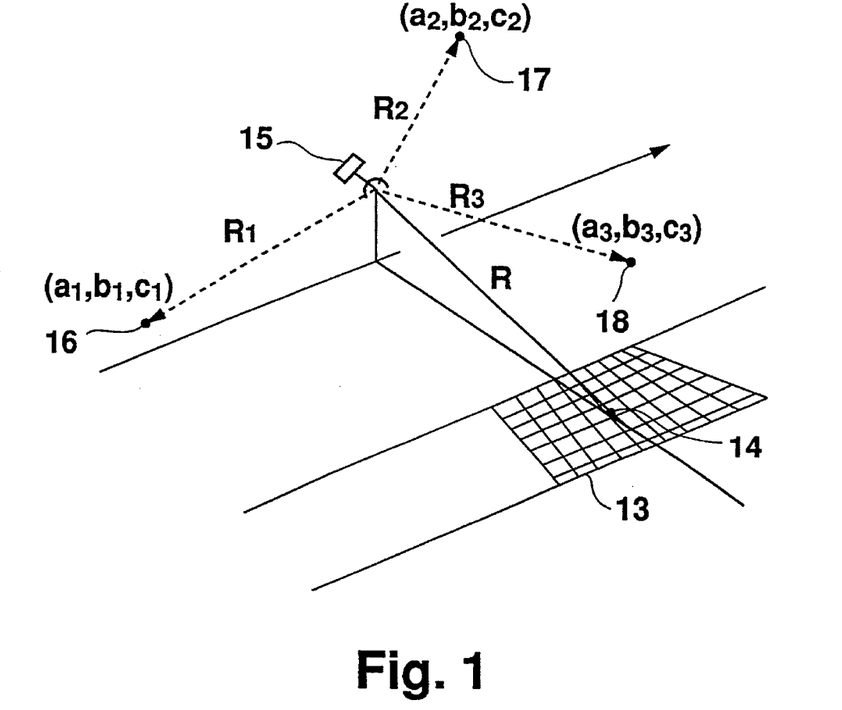
FIG. 1 is a schematic view showing a first and second embodiments of stabilizing method of a synthetic aperture radar according to the present invention.

The present invention will now be described in connection with its preferred embodiments with reference to the accompanying drawings, wherein the same parts as those described above in connection with the conventional embodiment shown in FIGS. 6 and 7 are designated by the same reference characters and thus the repeated description thereof can be omitted for brevity. FIG. 1 illustrates first and second embodiments of a motion compensation method of a synthetic aperture radar according to the present invention.

Now, the first embodiment of the present invention will be described in detail.

In FIG. 1, numerals 13, 14 and 15 denote an object to be acquired, a reference point for motion compensation, and a radar platform, respectively, and first, second and third repeaters 16, 17 and 18 are arranged in different positions.

Figure 2:
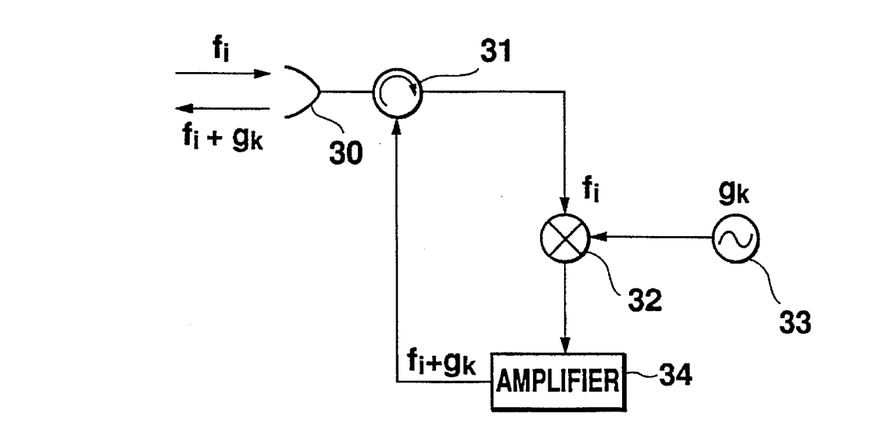
FIG. 2 is a schematic view showing a construction of repeaters shown in FIG. 1.

FIG. 2 shows a construction of the repeaters 16, 17 and 18. Each repeater 16, 17 or 18 includes a T/R antenna 30, a T/R changeover circulator 31, a mixer 32, a coherent oscillator 33 and an amplifier 34.

Figure 3:
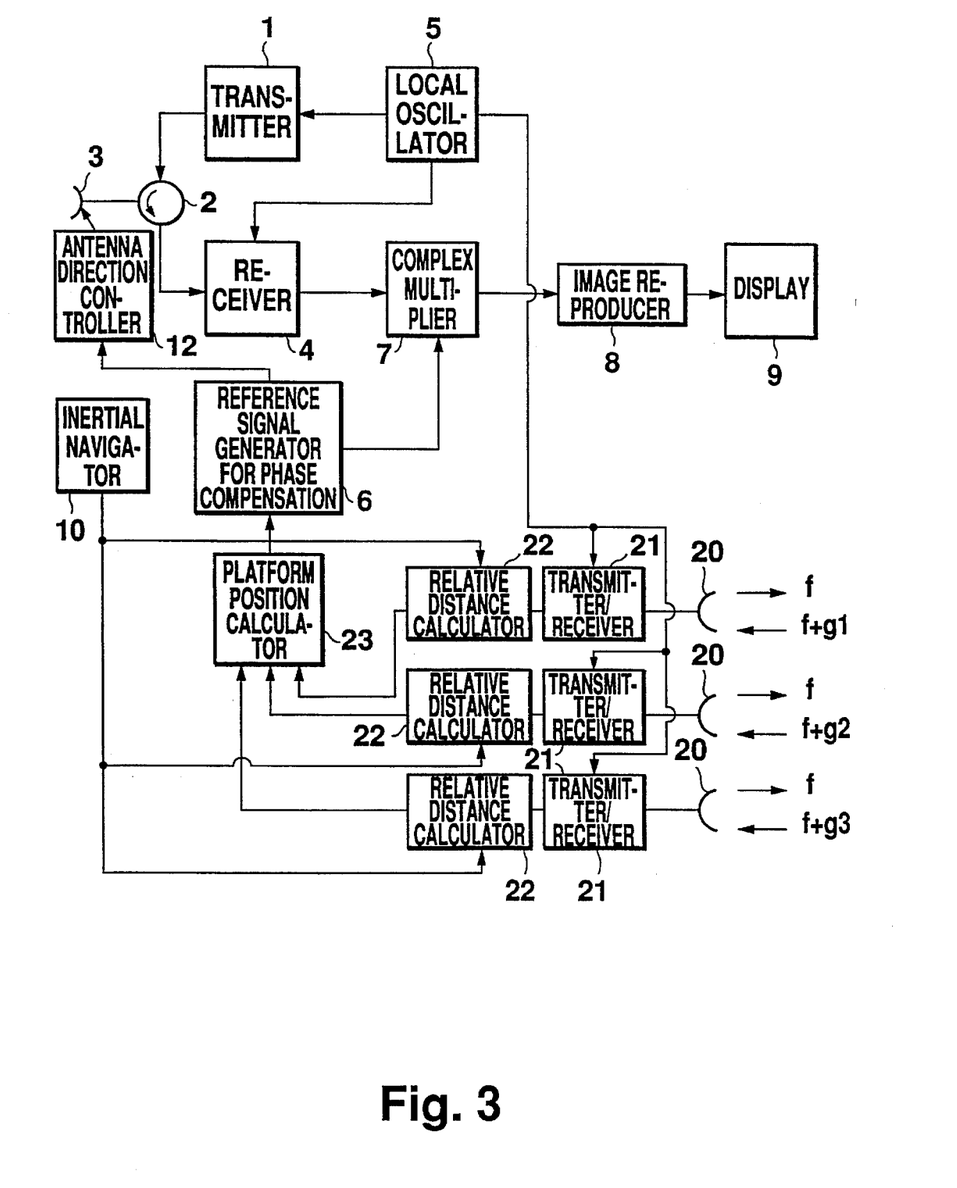
FIG. 3 is a block diagram of a synthetic aperture radar used in first and second embodiments of the present invention.

FIG. 3 illustrates one embodiment of a synthetic aperture radar used in the present invention. The synthetic aperture radar is comprised of a transmitter 1, a T/R changeover circulator 2, a T/R antenna 3, a receiver 4, a local oscillator 5 for supplying a local oscillation signal to the transmitter 1 and the receiver 4, a reference signal generator 6 for phase compensation, a complex multiplier 7 for carrying out a complex multiplication of two output signals supplied from the reference signal generator 6 and the receiver 4, an image reproducer 8 connected to the complex multiplier 7, a display 9 connected to the image reproducer 8, an inertial navigation system 10 for supplying data such as a position, a velocity and the like of a radar platform to relative distance calculators 22, and an antenna direction controller 12 for directing a beam of the antenna 3 to an object 13 to be acquired according to a reference signal for phase compensation, supplied from the reference signal generator 6. The synthetic aperture radar further comprises three antennas 20 for transmitting and receiving radio frequency signals having a frequency f toward and from the repeaters 16, 17 and 18, three transmitter/receiver 21 connected to the respective antennas 20, three relative distance calculators 22 connected to the respective transmitter/receivers 21 and the inertial navigation system 10 for calculating relative distances between the radar platform 15 and the respective repeaters 16, 17 and 18, and a platform position calculator 23 for calculating the position or coordinates of the radar platform 15 from the relative distances calculated in the relative distance calculators 22.

Next, a position determining method and a stabilizing method of a synthetic aperture radar by using the above-described system according to the present invention will now be described.

In FIG. 1, the coordinates of the radar platform 15 in the three-dimensional space are assumed to (x, y, z), and the coordinates of the reference point 14 for motion compensation and the three repeaters 16, 17 and 18 are also assumed to ($\alpha$, $\beta$, $\gamma$), (a1, b1, c1), (a2, b2, c2) and (a3, b3, c3), respectively. The relative distances R1, R2 and R3 between the radar platform 15 and the three repeaters 16, 17 and 18 are given as follows:

$$R1=\{(x-a1)^2+(y-b1)^2+(z-c1)^2\}^{1/2} \quad (1)$$

$$R2=\{(x-a2)^2+(y-b2)^2+(z-c2)^2\}^{1/2} \quad (2)$$

$$R3=\{(x-a3)^2+(y-b3)^2+(z-c3)^2\}^{1/2} \quad (3)$$

Figure 4:
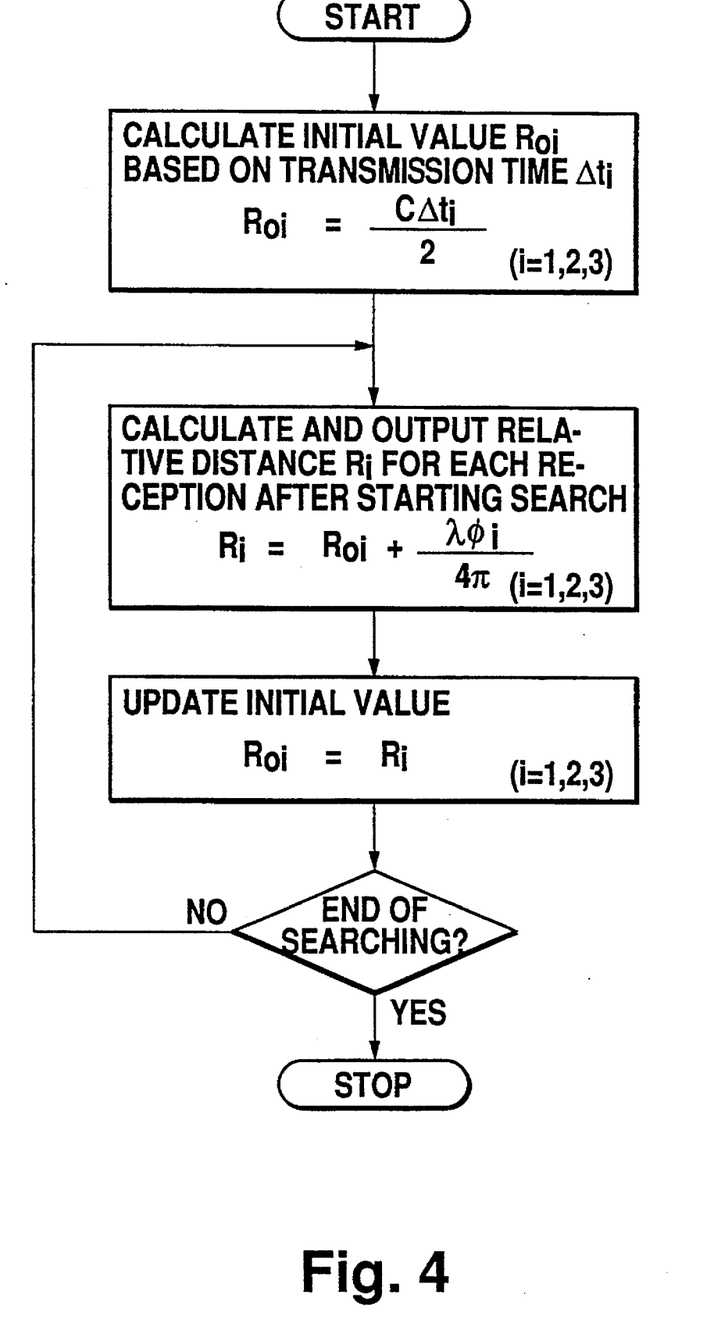
FIG. 4 is a flow chart showing an operation of a relative distance calculator shown in FIG. 3.

At this time, the coordinates of the repeaters 16, 17 and 18 are known. The relative distances R1, R2 and R3 are calculated in the relative distance calculators 22 by using signal transmission times $\Delta t1$, $\Delta t2$, and $\Delta t3$ in transmitting and receiving of the high frequency signals between the radar and the respective repeaters 16, 17 and 18 and the phases $\phi1$, $\phi2$, $\phi3$ of the received signals supplied from the respective transmitter/receivers 21 according to a processing flow shown in FIG. 4. Next, by considering equations (1) to (3) as three-dimensional simultaneous equations for obtaining the unknown quantities x, y and z, and solving these equations, the positional coordinates (x, y, z) of the radar platform 15 can be calculated with precision of a wavelength order in the platform position calculator 23 by using the obtained relative distances R1, R2 and R3. Then, by using this positional coordinates (x, y, z), a phase compensation amount $\phi$ against the coordinates ($\alpha$, $\beta$, $\gamma$) of any reference point 14 for phase compensation can be calculated according to equation (4). That is, in the reference signal generator 6 for phase compensation, the phase compensation amount $\phi$ can be calculated in accordance with equation (4) and the reference signal ref for phase compensation is produced according to equation (5).

$$\phi = -\frac{4\pi}{\lambda}\{(x-\alpha)^2+(y-\beta)^2+(z-\gamma)^2\}^{1/2} \quad (4)$$

$$ref = e^{-j\phi} = e^{+j\frac{4\pi}{\lambda}\{(x-\alpha)^2+(y-\beta)^2+(z-\gamma)^2\}^{1/2}} \quad (5)$$

At this time, as the positional coordinates ($\alpha$, $\beta$, $\gamma$) of the reference point 14 for phase compensation, it is sufficient for an operator to select, for example, any positional coordinates within the object to be acquired. In a usual application, the central point of the object to be acquired is selected.

By carrying out the series of transmitting and receiving operations to and from repeaters in synchronism with the transmitting and the receiving of the radio frequency signals to and from the object to be acquired, that is, by synchronizing the transmission timing of the transmitter/receivers 21 by using the output signal of the local oscillator 5, the positional variation of the radar platform due to the inclination is calculated and the reference signal for compensating this influence can be obtained. The obtained reference signal for phase compensation is multiplied to the output signal of the receiver 4 in the complex multiplier 7 in order to compensate the phase error caused by the inclination of the radar platform, included in the output signal of the receiver 4. As a result, the degradation of the imaging performance due to the maneuver of the radar platform can be suppressed.

Next, the second embodiment of the present invention will now be described in connection with FIGS. 1 to 3.

Although the frequency of the radio frequency signals which are transmitted from the transmitter/receivers 21 to the respective repeaters 16, 17 and 18 and are returned from the repeaters 16, 17 and 18 to the respective transmitter/receivers 21 are the same frequency f in the first embodiment, in this embodiment, as indicated by suffices in FIGS. 2 and 3, the radio frequency signals can be frequency-modulated with different frequencies g1, g2 and g3 in the repeaters 16, 17 and 18, respectively, and the radio frequency signals having the frequencies f+g1, f+g2 and f+g3 returned from the repeaters 16, 17 and 18 can be readily discriminated by the frequency differences. Hence, clutters like echoes from other material bodies or objects except the repeaters can be suppressed and the signal waves returned from the repeaters can be extracted without mixing.

The third embodiment of the present invention will now be described in connection with FIG. 5.

Figure 5:
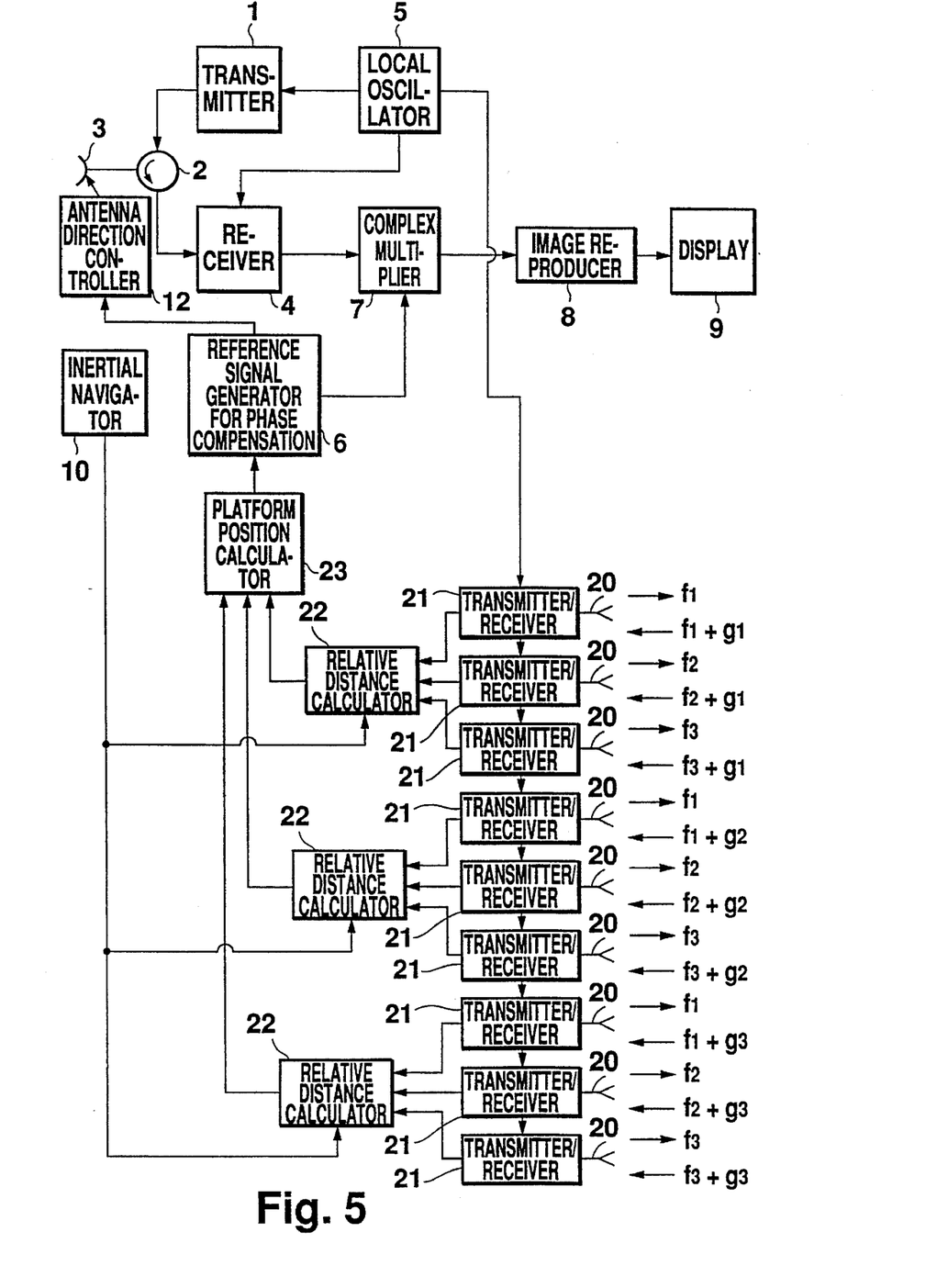
FIG. 5 is a block diagram of a synthetic aperture radar used in third embodiment of a stabilizing method according to the present invention.

FIG. 5 shows another embodiment of a synthetic aperture radar used in the present invention. In the above-described first and second embodiments, the frequencies of the radio frequency signals transmitted from the transmitter/receivers 21 to the repeaters 16, 17 and 18 are the same frequency f as that transmitted toward the object to be acquired. In this embodiment, as shown in FIG. 5, a plurality of transmitter/receivers 21 and a plurality of antennas 20 coupled therewith are provided for each relative distance calculator 22 so that radio frequency signals having a plurality of frequencies f1, f2 and f3 of a combination of mutually prime wavelengths may be transmitted and received between the radar platform 15 and the repeaters 16, 17 and 18. The radio frequency signals having the different frequencies f1, f2 and f3 can be frequency-modulated with different frequencies g1, g2 and g3 in the repeaters 16, 17 and 18 to obtain other radio frequency signals having different frequencies f1+g1, f2+g2 and f3+g3.

In this case, when the radio frequency signals having the different frequencies of the combination of the mutually prime wavelengths are transmitted and received between the transmitter/receivers 21 and the repeaters 16, 17 and 18 and between the radar platform 15 and the repeaters 16, 17 and 18, the distance variation calculated from the phases of the received signals without ambiguity can be extended to a product (complex) of the used wavelengths. That is, for example, in case of one frequency wave, the distance variation becomes a ½ wavelength such as 3 cm or 5 cm at the most. However, in this case, by combining three wavelengths such as 3 cm, 5 cm and 7 cm, the distance variation can be extended to $3 \times 5 \times 7 \div 2 = 50.25$ cm.

As described above, according to the present invention, the position of the radar platform is determined by the phase of the radio frequency signal communicated between the radar platform and the repeaters arranged on the ground or the sea and thus the positional variation of the radar platform can be measured with a precision of the same extent as the wavelength of the high frequency signal transmitted and received between the radar platform and the repeaters. Hence, the influence of the inclination or the like of the radar platform can be suitably compensated and the degradation of the imaging performance due to the influence of the inclination of the radar platform can be suppressed.

According to the present invention, in comparison with a conventional method utilizing only an inertial navigation system or a GPS, the position of the radar platform can be measured with a higher precision.

Further, according to the present invention, the radio frequency signals frequency-modulated with the mutually different frequencies by the repeaters are returned to the radar and the signals returned from the repeaters are discriminated in the radar side. Therefore, the clutters, i.e. the echoes from the material bodies or objects except the repeaters can be suppressed and the signal waves returned from the repeaters can be extracted without mixing. As a result, the precision of the motion compensation and the position determination precision can be improved.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A position determining method of a radar platform by a radar mounted thereon, comprising the steps of:

a first step for transmitting at least three first signals, from the radar to at least three signal answer back means arranged in predetermined mutually different positions, the at least three first signals having mutually different predetermined frequencies;

a second step for receiving one of the first signals transmitted in the first step by each signal answer back means;

a third step for transmitting a second signal from each signal answer back means toward the radar platform in response to the one of the first signals received in the second step;

a fourth step for receiving the second signals transmitted from the signal answer back means by the radar;

a fifth step for detecting times from the transmitting of the first signals to the receiving of each of the second signals by the radar;

a sixth step for detecting phases of each of the second signals received in the fourth step by the radar;

a seventh step for calculating distances between the radar platform and each of the signal answer back means on the basis of the times detected in the fifth step and the phases detected in the sixth step; and an eighth step for calculating a position of the radar platform on the basis of known positions of each of the signal answer back means and the distances calculated in the seventh step.

2. The position determining method of claim 1, wherein the radar platform is an aircraft.

3. The position determining method of claim 1, wherein the radar is a synthetic aperture radar.

4. The position determining method of claim 1, wherein each signal answer back means includes:

means for receiving one of the first signals transmitted from the radar;

means for amplifying the one of the first signals received by the receiving means; and means for transmitting the one of the first signals amplified by the amplifying means as the second signal toward the radar platform.

5. The position determining method of claim 1, wherein each signal answer back means includes:

means for receiving one of the first signals transmitted from the radar;

means for frequency-modulating the one of the first signals received by the receiving means with a predetermined modulation frequency;

means for amplifying the one of the first signals frequency-modulated by the frequency-modulating means; and means for transmitting the one of the first signals amplified by the amplifying means as the second signal toward the radar platform.

6. The position determining method of claim 5, wherein the frequency-modulating means of each signal answer back means use mutually different modulation frequencies.

7. A position determining system for determining a position of a radar platform, comprising:

a radar mounted on the radar platform; and at least three signal answer back means arranged in predetermined mutually different positions;

the radar including means for transmitting at least three first signals having mutually different predetermined frequencies to the at least three signal answer back means;

each signal answer back means including:

means for receiving one of the first signals transmitted from the radar; and means for transmitting a second signal, having a predetermined frequency, to the radar platform in response to receiving the one of the first signals, the radar further including:

means for receiving the second signals transmitted from the signal answer back means;

first detecting means for detecting times from the transmitting of the first signals to the receiving of each of the second signals;

second detecting means for detecting phases of each of the second signals received;

first calculating means for calculating distances between the radar platform and the signal answer back means on the basis of the times detected and the phases detected; and second calculating means for calculating a position of the radar platform on the basis of known positions of the signal answer back means and the distances calculated.

8. The position determining system of claim 7, wherein the radar platform is an aircraft.

9. The position determining system of claim 7, wherein the radar is a synthetic aperture radar.

10. The position determining system of claim 7, wherein each signal answer back means further includes:

means for amplifying the one of the first signals received by the receiving means; and means for transmitting the one of the first signals amplified by the amplifying means as the second signal toward the radar platform.

11. The position determining system of claim 7, wherein each signal answer back means further includes:

means for frequency-modulating the one of the first signals received by the receiving means with a predetermined modulation frequency;

means for amplifying the one of the first signals frequency-modulated by the frequency-modulating means; and means for transmitting the one of the first signals amplified by the amplifying means as the second signal toward the radar platform.

12. The position determining system of claim 11, wherein the frequency-modulating means of each signal answer back means use mutually different modulation frequencies.

13. A motion compensation method of a synthetic aperture radar mounted on a radar platform, comprising the steps of:

a first step for transmitting a first signal having a predetermined frequency from the radar to at least three signal answer back means arranged in predetermined mutually different positions;

a second step for receiving the first signal transmitted in the first step by each signal answer back means;

a third step for generating in each of the signal answer back means a second signal by frequency modulating the first signal with a predetermined modulation frequency;

a fourth step for transmitting the second signal from each signal answer back means toward the radar platform;

a fifth step for receiving the second signals transmitted from the signal answer back means by the radar;

a sixth step for detecting times from the transmitting of the first signal to the receiving of each of the second signals, by the radar;

a seventh step for detecting phases of each of the second signals received in the fifth step by the radar;

an eighth step for calculating distances between the radar platform and the signal answer back means on the basis of the times detected in the sixth step and the phases detected in the seventh step;

a ninth step for calculating a position of the radar platform on the basis of known positions of the signal answer back means and the distances calculated in the eighth step;

a tenth step for generating a reference signal for motion compensation on the basis of the position of the radar platform, calculated in the ninth step;

an eleventh step for transmitting a signal from the radar to an object to be acquired and receiving a reflected signal from the object; and a twelfth step for multiplying the reference signal for motion compensation by the reflected signal received in the tenth step, the position calculated in the ninth step varying depending on an inclination of the radar platform, the reference signal for phase compensation generated in the tenth step varying depending on the inclination of the radar platform, a phase variation of the reflected signal received in the eleventh step being compensated by the multiplying in the twelfth step.

14. The motion compensation method of claim 13, further comprising a thirteenth step for displaying an image on the basis of a signal obtained by the multiplying in the twelfth step.

15. The motion compensation method of claim 13, wherein the first step includes a step of transmitting at least three signals having mutually different frequencies from the radar to the at least three signal answer back means.

16. The motion compensation method of claim 13, wherein the third step includes a step of frequency modulating the second signal of each of the signal answer back means with a different modulation frequency.

17. A system for determining a position of a radar platform, comprising:

a radar mounted on the radar platform; and at least three signal answer back means arranged in predetermined mutually different positions, each of the signal answer back means including:

means for receiving a first signal transmitted from the radar;

means for generating a second signal by frequency modulating the first signal with a predetermined frequency, and means for transmitting the second signal to the radar platform; the radar further including:

means for transmitting the first signal;

means for receiving each second signal transmitted from each of the signal answer back means;

first detecting means for detecting time periods from the transmitting of the first signal to the receiving of each of the second signals;

second detecting means for detecting phases of each of the second signals received;

first calculating means for calculating distances between the radar platform and each signal answer back means on the basis of the time periods detected and the phases detected; and second calculating means for calculating a position of the radar platform on the basis of known positions of the signal answer back means and the distances calculated.

18. The system of claim 17, wherein the means for transmitting the first signal includes means for transmitting at least three first signals having mutually different frequencies, and wherein each of the signal answer back means receives one of the at least three first signals.

19. The system of claim 17, wherein the predetermined modulation frequencies of each of the answer back means are mutually different.

20. A synthetic aperture radar system including motion compensation comprising:

a radar mounted on a radar platform; and at least three transponders, each transponder including:
- a receiver that receives a first signal from the radar;
- a frequency modulator that frequency modulates the first signal at a predetermined modulation frequency to create a second signal;
- a transmitter that transmits the second signal to the radar; and the radar further including:
- a transmitter that transmits the first signal;
- a receiver that receives each second signal from each of the transponders;
- a relative distance calculator that calculates distances from the transponders and the radar based on time and phase differences between the first signal and the second signals;
- a platform position calculator that determines the position of the radar platform based on known positions of the transponders and the distances from the transponders to the radar;
- a reference signal phase compensation generator that generates a reference compensation signal based upon the position of the radar platform;
- a radar transmitter that transmits a signal from the radar to an object to be acquired by the radar;
- a radar receiver that receives a reflected signal from the object to be acquired; and
- a multiplier that combines the received reflected signal with the reference compensation signal.

21. The radar of claim 20, wherein each of the transponders have mutually different modulation frequencies.

22. The radar of claim 21, wherein the transmitter transmits at least three signals having mutually different frequencies, and wherein each of the transponders receives one of the at least three signals.

* * * * *